Feb. 4, 1964    D. C. WORLTON ETAL    3,120,120
ULTRASONIC METHOD OF MEASURING THICKNESS USING LAMB WAVES
Filed Feb. 27, 1962    2 Sheets-Sheet 1
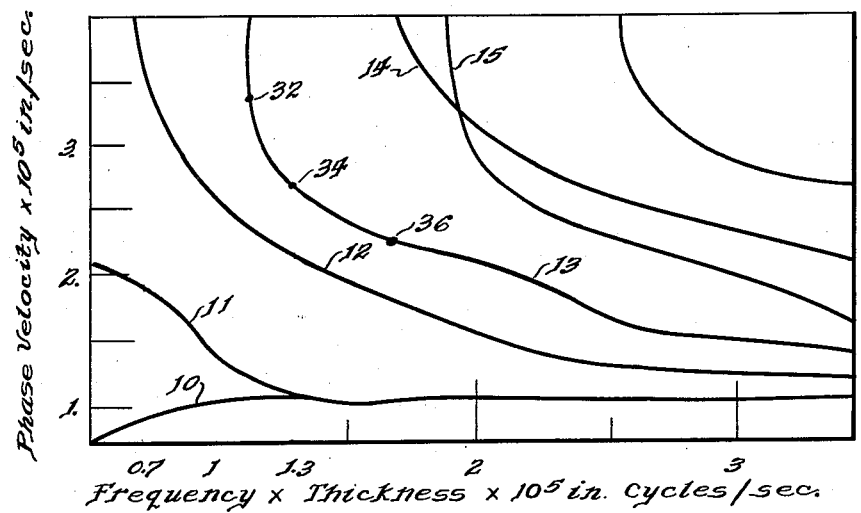
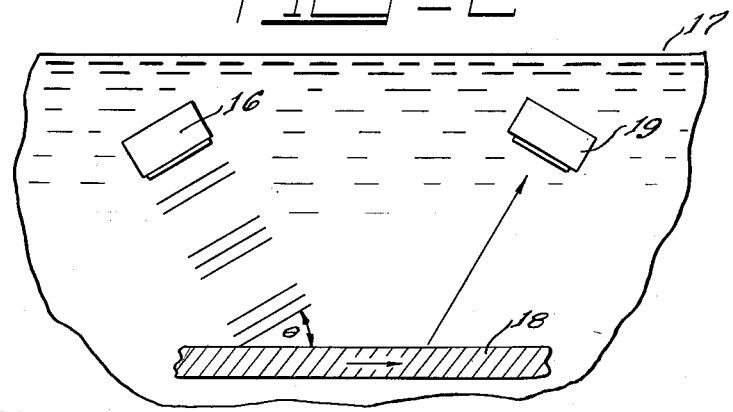
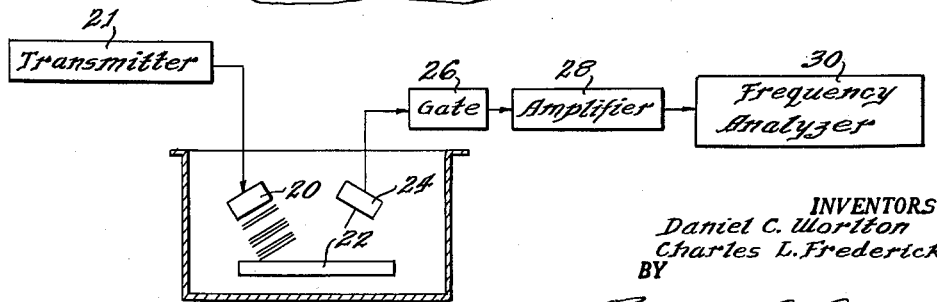
INVENTORS
Daniel C. Worlton
Charles L. Frederick
BY
Attorney Feb. 4, 1964     D. C. WORLTON ETAL     3,120,120
ULTRASONIC METHOD OF MEASURING THICKNESS USING LAMB WAVES
Filed Feb. 27, 1962     2 Sheets-Sheet 2
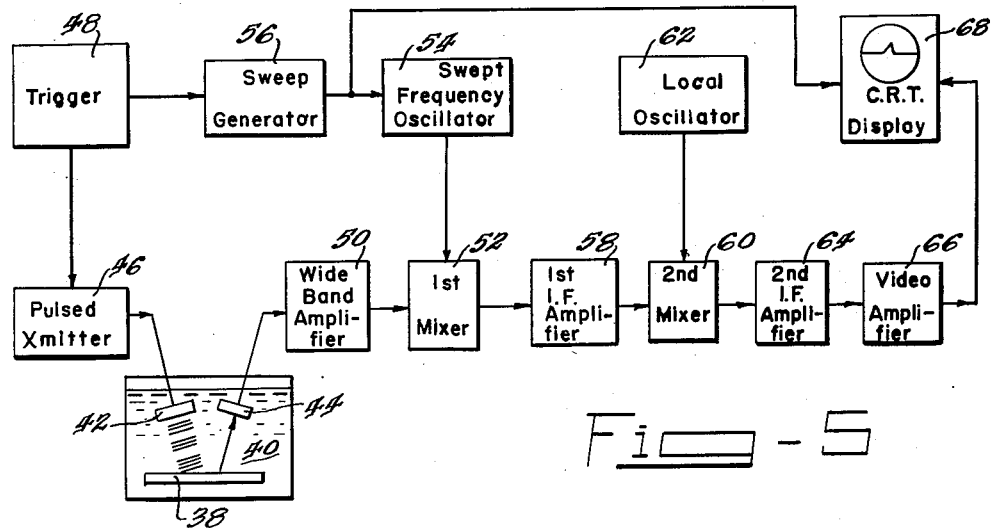
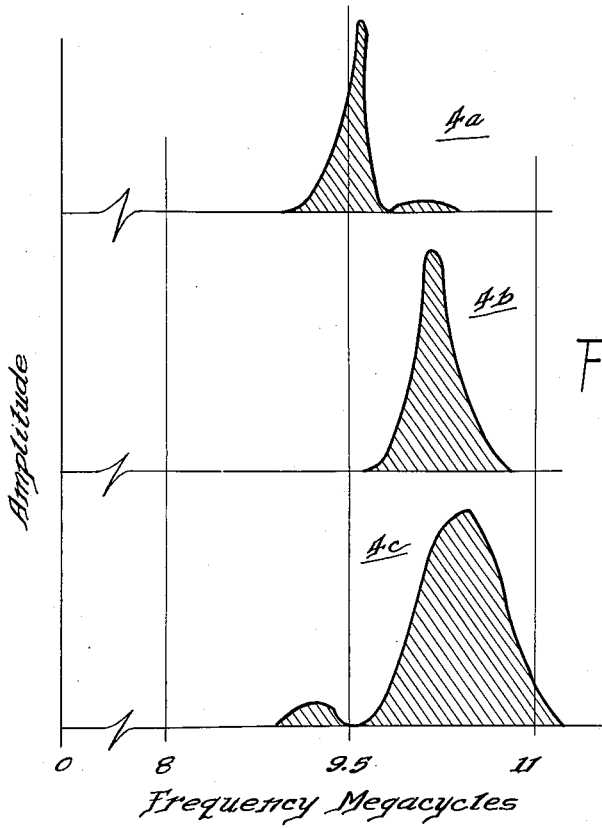
INVENTORS
Daniel C. Worlton
Charles L. Frederick
BY
Attorney United States Patent Office 3,120,120
Patented Feb. 4, 1964

3,120,120
ULTRASONIC METHOD OF MEASURING
THICKNESS USING LAMB WAVES
Daniel C. Worlton and Charles L. Frederick, Richland, Wash., assignors to the United States of America as represented by the United States Atomic Energy Commission
Filed Feb. 27, 1962, Ser. No. 176,168
1 Claim. (Cl. 73—67.5)

This patent relates to nondestructive methods of measuring the thickness of a metal sample and more specifically to methods using Lamb waves to measure the thickness of a metal sample.

Presently existing ultrasonic nondestructive techniques used in measuring the thickness of a metal sample are not suited to production type applications since the transducer test head has to be placed in direct contact with the metal sample and readings therefrom are difficult and tedious to obtain. Further, the accuracy of the present techniques is limited and is unsuitable for accurate measurements of thin section plate or tubing.

It is therefore one object of the present invention to provide a nondestructive method for measuring the thickness of a metal sample to a high degree of accuracy from one side of the sample.

It is another object of the present invention to provide a nondestructive method for measuring the thickness of a metal sample within 0.0001 inch without the necessity of direct contact between sensing head and sample.

It is another object of this invention to provide a rapid nondestructive method which is suitable to production type application in measuring the thickness of a metal sample to a high degree of accuracy.

It is still another object of this invention to provide a method using Lamb waves to measure the thickness of a thin metal sample to a high degree of accuracy.

Other objects of the present invention will become more apparent as the detailed description proceeds.

In general, the present invention comprises generating pulsed ultrasonic plane waves having a wide frequency spectrum. The plane waves are caused to travel through a coupling medium and strike the test sample at a predetermined angle of incidence. Discrete frequencies within the pulsed plane waves cause Lamb wave modes within the test sample to be excited dependent upon the thickness thereof and the velocity of the plane waves along the surface of the test sample. The excited Lamb waves travel along the sample at a phase velocity equal to the surface velocity of the plane waves, radiating pulsed waves therefrom at an angle of exit equal to the angle of incidence. The radiated waves contain only the discrete frequencies which excited the Lamb waves. These discrete frequencies are detected to give a measurement of the thickness of the metal sample.

More complete understanding of the invention will best be obtained from consideration of the accompanying drawings in which:

FIGURE 1 is a graphical representation of Lamb wave modes in aluminum plate as a function of phase velocity versus the product of frequency and depth of the plate.

FIGURE 2 is a fragmentary sketch of an apparatus for generating Lamb wave modes in a sample.

FIGURE 3 is a block diagram of an apparatus for practicing the principles of the present invention.

FIGURE 4 is a graphical representation of wave traces received from signals emitted by a certain Lamb wave mode which is excited different phase velocities.

FIGURE 5 is a block diagram of a preferred apparatus for practicing the principle of the present invention.

When an ultrasonic wave impinges on a metal plate, an infinite number of Lamb wave modes of vibration may be generated within the plate, depending upon the material and thickness of the plate and the frequency of the ultrasonic wave. Each Lamb wave mode is propagated with a unique phase velocity that is related to the product of the frequency of the ultrasonic wave and the thickness of the plate. FIGURE 1 illustrates this relationship for aluminum plate. In FIGURE 1, curves 10 and 11 are plots of the first asymmetrical and first symmetrical modes respectively, curves 12 and 13 plots of the second asymmetrical and second symmetrical modes respectively, and curves 14 and 15 plots of the third asymmetrical and third symmetrical modes respectively. The curves plotted in FIGURE 1 show that two sets of modes are possible, the symmetrical and the asymmetrical modes. These two modes are distinguished only by the manner in which individual particles are displaced within the plate and for the purposes of the present invention they may be considered equivalent. It is to be understood that similar curves as shown in FIGURE 1 exist for other materials such as brass, zirconium, and stainless steel.

It has been determined that the above described modes may be established in curved objects such as tubes as well as in the well known flat plates. The main criterion for the establishment of the Lamb wave modes is that the sample provide parallel acoustic boundaries wherein the distance between the boundaries bears the proper relationship to the wave frequency.

The transducer arrangement in FIGURE 2 is shown to illustrate the principle of the present invention. A transmitting transducer 16 immersed in a water coupling medium 17 generates ultrasonic plane waves which travel through the water coupling 17 and impinge on the surface of a sample 18 at a predetermined angle $\theta$. The point of contact between a plane wave front and the sample 18 runs along the surface of the metal sample 18 with a velocity $v$. The velocity $v$ is equal to $$\frac{V_w}{\sin \theta}$$

where $V_w$ is the velocity of the ultrasound in the coupling medium 17 and $\theta$ is the angle of incidence of the plane wave. When the incident angle $\theta$ is chosen so that the surface velocity $v$ is equal to the phase velocity of a particular Lamb wave mode, then that particular Lamb wave mode will be excited in the sample 18 provided that the frequency times depth product therefor is correct. Once the sample 18 is set into vibration at the desired Lamb wave mode, energy therefrom is radiated into the water coupling medium 17 at an exit angle equal to the incident angle $\theta$. The receiving transducer 19 is aligned to detect the radiated energy from the sample 18.

As recited supra, a given Lamb wave mode is propagated within the sample 18 only upon the condition that the incident plane wave angle $\theta$, thickness of the metal sample 18, and frequency of the plane wave satisfy the requirements set forth by the curves illustrated in FIGURE 1. Fixing any two of these parameters uniquely determines the third. Thus, the thickness of the sample 18 may be measured by fixing the incident angle $\theta$ at a known value, and measuring the radiated frequency at which a particular mode propagates therein.

For example, suppose the transmitting transducer 16 is positioned so that the transmitted plane waves therefrom impinge on the sample 18 at unknown thickness at an angle of 13.2 degrees and the frequency of the plane waves is 10 mc. Further, assuming that the velocity of the ultrasound in water is 0.57 in./sec., then the phase velocity of the corresponding Lamb wave modes is $2.5 \times 10^5$ in./sec. Therefore, in an aluminum sample with a phase velocity of $2.5 \times 10^5$ in./sec. and a frequency of 10 mc., excitation of the second asymmetrical mode fixes the thickness of the sample at 0.010 inch. If the thickness of the sample were to change by 0.001 inch, making the total thickness 0.011 inch, the frequency of the plane waves would have to be changed to 9.1 mc. to excite the same Lamb wave mode. Consequently, for this example a 900 kc. change in frequency is equivalent to 0.001 inch change in thickness.

Consideration is now given to the apparatus of FIGURE 3 for measuring the thickness of a sample by measuring the radiated frequency therefrom. A 10 mc. lead metaniobate transducer 20 is excited with short, fast rise time, pulses generated by transmitter 21. This results in a frequency spectrum of 6 mc. to 13 mc. with a center frequency at approximately 10 mc. in the pulsed plane waves transmitted by the transducer 20. The pulsed plane waves are impinged on the surface of the sample 22 at a predetermined angle of incidence. The radiated frequencies from the sample 22 as a result of particular Lamb wave modes being excited therein are detected by a receiving transducer 24 aligned at the image angle of the transmitting transducer 20, gated by gating circuit 26, amplified by a wide band amplifier 28, and then fed to a panoramic type radiofrequency spectrum analyzer 30.

The operation of the apparatus of FIGURE 3 may best be shown by an example. Using the aforementioned bandwidth of the transducer 20 and an angle of incidence of 9.1 degrees for the plane waves generated therefrom, discrete frequencies centered at 7.9 and 11.5 mc. were detected by the analyzer 30 for an aluminum plate of 0.010 inch thickness. Reference to the curves of FIGURE 1 shows that these frequencies are in agreement with the second asymmetrical and second symmetrical modes 12 and 13. For increases in thickness of 0.001 inch in the aluminum plate, the other parameters being held the same, the detected frequencies by the analyzer 30 agreed with the curve values of FIGURE 1.

It is evident that the thickness measurements are ambiguous unless the order of the Lamb wave mode being excited is identified. A solution for this problem is to purposely choose the operating frequencies of the plane waves so as to encompass the second asymmetrical mode. Since the first symmetrical and asymmetrical modes are not excited under normal test procedures, the second asymmetrical mode may be identified because it will always be associated with the lowest received frequency.

While it is desirable to have a broad band of frequencies in the transmitted plane waves, it is obviously desirable that the frequencies leaving the sample have as narrow a band as possible to provide optimum precision of measurement by the analyzer. Thus, it is desirable for the sample to act as a sharp cutoff filter. The extent to which the sample acts as a cutoff filter depends upon the slope of the phase velocity curve at the point at which the Lamb wave mode is excited. This is illustrated in FIGURES 4a, 4b and 4c which show wave traces of a single Lamb wave mode that is generated at three different points 32, 34 and 36 along the phase velocity curve of the second symmetrical mode 13 in FIGURE 1. The trace of FIGURE 4a corresponds to the mode at point 32, FIGURE 4b corresponds to the point 34 and FIGURE 4c corresponds to the point 36. It is apparent that as the slope of the phase velocity curve increases the bandwidth narrows. Thus, it is desirable to operate in measuring thickness at the high values of phase velocity. However, there is a practical limitation on how high a phase velocity may be used since the efficiency of mode excitation is reduced for very small incident angles and a compromise value is found to be the most practical.

Reference is now made to the apparatus of FIGURE 5 for rapid and continuous thickness measurements of a sample 38 which is passed through a coupling medium 40 wherein transmitting and receiving transducers 42 and 44 are mounted and aligned at predetermined angles. A pulsed transmitter 46 gated by a trigger circuit 48 drives the transmitting transducer 42 with a sharp pulse at a variable repetition rate of 1000 to 5000 pulses/second. The transducer 42 generates a wide frequency band of ultrasonic energy which impinges on the surface of sample 38 at the predetermined angle of incidence. As previously recited, unique Lamb wave modes will be excited in the test sample 38 dependent upon the thickness thereof, and the surface velocity and the frequency of the incident waves. These unique Lamb wave modes will travel along the test sample 38 radiating ultrasonic waves at an angle of exit equal to the angle of incidence and at discrete frequencies. Receiving transducer 44, set at the image angle of the transmitting transducer 42 is carefully adjusted to ignore surface reflections and detects the discrete frequencies of the radiated ultrasonic waves. The output from the receiving transducer 44 is amplified by amplifier 50 and then mixed in mixer 52 with the output of a sweep frequency oscillator 54. The sweep frequency oscillator 54 is swept through a frequency range by sweep generator 56 driven at an adjusted repetition rate by trigger 48. The additive frequency output from mixer 52 is amplified by first I-F amplifier 58 and fed to a second mixer 60 where it is mixed with the output from local oscillator 62. Double mixing in mixers 52 and 60 is used to give a narrow I-F bandwidth. The output from mixer 60 is amplified by a second I-F amplifier 64 and a video amplifier 66 and then fed to the input of a cathode ray oscilloscope 68. The sweep of the cathode ray oscilloscope 68 is triggered by sweep generator 56 thereby giving a synchronized trace with sweep frequency oscillator 54. Thus, the signal appearing on the tube of the cathode ray oscilloscope 68 appears at a time dependent on the original frequency of the mode and the tube face of the oscilloscope 68 may be calibrated directly in thickness measurements for sample 38. Readout devices other than oscilloscope 68 may be used to provide continuous and recorded thickness measurements.

Persons skilled in the art will, of course, readily adapt the teachings of the invention to methods far different from the methods herein described. Accordingly, the scope of the protection afforded the invention should not be limited to the particular methods described but shall be determined only in accordance with the appended claim.

What is claimed is:

A method of measuring thickness of a metal sample comprising generating at a variable repetition rate pulsed ultrasonic plane waves having a wide frequency spectrum, causing said pulsed ultrasonic plane waves to flow through a coupling medium and impinge on said metal sample at a predetermined angle of incidence, discrete frequencies in said pulsed ultrasonic waves causing Lamb wave modes to be excited in said metal sample dependent upon the thickness thereof, said angle of incidence of said pulsed ultrasonic waves determining the phase velocity of said Lamb waves in said metal sample, detecting the ultrasonic waves radiated by said Lamb waves at an angle of exit from said metal sample equal to the angle of incidence of said pulsed ultrasonic waves, converting said detected radiated ultrasonic waves into electrical pulses containing the same discrete frequencies as said radiated ultrasonic waves, amplifying said electrical pulses, additively mixing the frequencies contained in said electrical pulses with the output of an oscillator driven by a sweep generator triggered at the same variable repetition rate as said pulsed ultrasonic plane waves, amplifying the additively mixed electrical pulses, and displaying said additively mixed electrical pulses on an oscilloscope whose sweep is synchronized with said sweep generator, the time of appearance of the signal on the face of said oscilloscope being dependent on the original frequency of said excited Lamb wave mode and hence directly proportional to the thickness of said metal sample.

References Cited in the file of this patent

UNITED STATES PATENTS

| | | |
|---|---|---|
| 2,499,459 | Carlin | Mar. 7, 1950 |
| 2,514,482 | Farmer | July 11, 1950 |
| 2,536,128 | Firestone et al. | Jan. 2, 1951 |
| 2,769,158 | Shultz | Oct. 30, 1956 |
| 2,921,465 | Cook | Jan. 19, 1960 |
| 2,995,925 | Worlton | Aug. 15, 1961 |
| 3,005,335 | Erdman | Oct. 24, 1961 |

OTHER REFERENCES

AEC Research and Development Report HW 60662, Lamb Waves at Ultrasonic Frequencies, by D. C. Worlton, June 9, 1959, 62 pages.

Pages 45.12 and 45.13, Non-Destructive Testing Handbook, vol. II, Call No. T$a$410 M 32, published 1959, Roland Press.